United States Patent
Sioma

(10) Patent No.: US 9,515,511 B1
(45) Date of Patent: Dec. 6, 2016

(54) SYSTEM AND CIRCUIT FOR RECHARGING LARGE CAPACITY BATTERIES

(71) Applicant: Edward M. Sioma, Levittown, PA (US)

(72) Inventor: Edward M. Sioma, Levittown, PA (US)

( * ) Notice: Subject to any disclaimer, the term of this patent is extended or adjusted under 35 U.S.C. 154(b) by 5 days.

(21) Appl. No.: 14/255,996

(22) Filed: Apr. 18, 2014

(51) Int. Cl.
*H02J 7/02* (2016.01)
*H02J 7/00* (2006.01)

(52) U.S. Cl.
CPC ........ *H02J 7/022* (2013.01); *H02J 2007/0059* (2013.01)

(58) Field of Classification Search
CPC .............................. H02J 7/022; H02M 7/219
USPC ......................................................... 320/107
See application file for complete search history.

(56) References Cited

U.S. PATENT DOCUMENTS

| | | | |
|---|---|---|---|
| 4,333,134 A | 6/1982 | Gurwicz | |
| 5,654,621 A * | 8/1997 | Seelig | B60L 11/182 320/108 |
| 2008/0238364 A1* | 10/2008 | Weber et al. | 320/108 |
| 2009/0010031 A1* | 1/2009 | Kuan | H02M 3/158 363/101 |
| 2012/0313728 A1* | 12/2012 | Cairo, Jr. | H02J 3/01 333/174 |
| 2013/0026975 A1* | 1/2013 | Liu | H02J 7/022 320/107 |
| 2013/0188405 A1* | 7/2013 | Jin et al. | 363/49 |

* cited by examiner

*Primary Examiner* — Yalkew Fantu
*Assistant Examiner* — Manuel Hernandez
(74) *Attorney, Agent, or Firm* — LaMorte & Associates P.C.

(57) ABSTRACT

A system and circuit for recharging a battery using an AC power source. A tuned circuit is created using a capacitor, an inductor, a rectifier and the battery being recharged. The rectifier and battery combine to create circuitry that is equivalent to an AC component. The equivalent circuitry is in series with the inductor. The capacitor is in parallel with the inductor and equivalent circuitry. The resultant circuit is tuned and can be operated at a resonance frequency. In operation, the tuned circuit provides a recharging current to the battery without the need for a transformer or current resistive elements. The result is a recharging system and circuit that is smaller, lighter and far more power efficient than prior art battery chargers.

16 Claims, 2 Drawing Sheets

SYSTEM AND CIRCUIT FOR RECHARGING LARGE CAPACITY BATTERIES

BACKGROUND OF THE INVENTION

1. Field of the Invention

In general, the present invention relates to systems and circuits that are used to recharge batteries. More particularly, the present invention relates to systems and circuits that recharge large capacity batteries from an available AC power source.

2. Prior Art Description

Batteries store electricity and provide that electricity as a direct current when used. If a battery is designed to be recharged, that battery can only be recharged by receiving a direct current from an outside power source. Alternating current power sources cannot be directly used to recharge the battery. The use of an alternating current can damage or destroy a rechargeable battery. Furthermore, the DC voltage provided to a battery when recharging must be greater than the voltage rating of the battery. As such, it takes more than 12 volts to recharge a 12 volt battery. However, for many reasons inherent in the construction of a battery, a battery is best recharged by a voltage that is not much higher than the voltage rating of the battery. Thus, it is far better to recharge a 12 volt battery with a voltage of under 20 volts than it would be to recharge the same battery with a 120 DC volt source.

Most people obtain power from an electrical utility company through the use of the power grid that is provided by the company. In the United States, the power grid usually provides 240 volts and 120 volts at 60 Hz. Within a home or building, only one phase of power is used in most circuits. As such, most power outlets provide 120 volts at 60 Hz. In order to recharge a battery using a typical outlet, a battery charger must be used. The battery charger typically contains a transformer that lowers the output voltage to an acceptable range. The reduced output voltage is then rectified to convert the alternating current into a direct current. Lastly, a series of resistive elements are used to limit or fix the magnitude of the charging current. Without the use of the resistive elements, large rechargeable batteries would draw large currents and would blow fuses or trip circuit breakers in the home.

It will be understood that transformers and resistive elements create operating losses in power. According to Ohm's law, the power loss in Watts is equal to the resistance in Ohms times the current in amps, squared. Thus, if a battery charger for a large rechargeable battery has three Ohms of resistance, 2700 Watts of power are lost as the battery recharges.

The prior art is replete with rechargeable batteries and chargers for such batteries. Chargers for large capacity rechargeable batteries utilize both transformers and resistive elements. Thus, such prior art battery chargers inherently consume significant amounts of power as they operate, as has been explained. Such prior art battery chargers are exemplified by U.S. Pat. No. 4,333,134 to Gurwicz, and U.S. Patent Application Publication No. 2013/0026975 to Liu.

Many popular devices, such as phones and computers, use rechargeable batteries. However, such devices are relatively low power and contain small batteries that can be rapidly recharged using conventional methods. Due to the small size and power of the batteries, the inefficiencies inherent in the recharging systems for the batteries can be overlooked as being insignificant. However, in devices that use large rechargeable batteries, inefficiencies in prior art recharging systems become problematic, resulting in recharging systems that are both costly to operate and time consuming to use.

Consumer products, such as electric vehicles, with large powerful rechargeable batteries, are becoming more popular in the marketplace. In operation, many electric vehicles, such as electric cars, electric forklifts, and the like, can consume over one hundred kilowatts of power. Two of the largest factors that have hampered the consumer acceptance of such electric vehicles are the time and cost required to recharge the vehicle's large batteries. For example, there are electric vehicles being sold to the public that operate at 120 volts DC and use over 100 Kilowatts of power. In order to recharge such large capacity batteries from a traditional AC receptacle requires a large transformer to control voltage and numerous resistive elements to pace the large currents that can be drawn by such batteries. Using traditional recharging technologies, the power losses can easily exceed 1000 Watts. As such, the power lost by the prior art recharging system is large enough to run a household air conditioning system. Losses in power result directly in increased costs for the power drawn from the utility company.

A need therefore exists for an improved system and circuit that can be used to more efficiently recharge large capacity batteries from a household AC power source, wherein the system charges large batteries faster and wastes less power than traditional prior art charging systems. These needs are met by the present invention as described and claimed below.

SUMMARY OF THE INVENTION

The present invention is a system and circuit for recharging a battery using an AC power source. A tuned circuit is created using a capacitor, an inductor, a rectifier and the battery being recharged. The rectifier and battery combine to create equivalent circuitry. The equivalent circuitry is in series with the inductor. The capacitor is in parallel with the inductor and equivalent circuitry.

The resultant circuit is tuned and can be operated at a resonance frequency. In operation, the tuned circuit provides a recharging current to the battery without the need for a transformer or current resistive elements. The result is a recharging system and circuit that is smaller, lighter and far more power efficient than prior art battery chargers.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention battery charging system can be embodied in many ways, the embodiment illustrated shows the system being used to recharge the large battery bank of an electric vehicle. This embodiment is selected in order to set forth one of the best modes contemplated for the invention. The illustrated embodiment, however, is merely exemplary and should not be considered a limitation when interpreting the scope of the appended claims.

RLC circuits, i.e. resistor/inductance/capacitor circuits, are one of the fundamental circuit types used in the design and implementation of circuit design. When used with an alternating current power source, RLC circuits can be tuned to achieve resonance. In a tuned RLC circuit, the selected values for the resistance, inductance and capacitance are dependent upon the frequency of the incoming AC signal. Resonance occurs when the inductive and capacitive reactances are equal in magnitude but cancel each other because they are 180 degrees out of phase. This zero phase imparts a minimum impedance to the circuit.

In a parallel RLC circuit, the voltage and current are in phase at the resonant frequency, where the resonant frequency is derived from Equation 1 below.

$$Freq \text{ in Hz} = \frac{1}{2\pi\sqrt{LC}} \qquad \text{Equation 1}$$

Where L is the load or inductor, and C is the capacitance.

Figure 1:
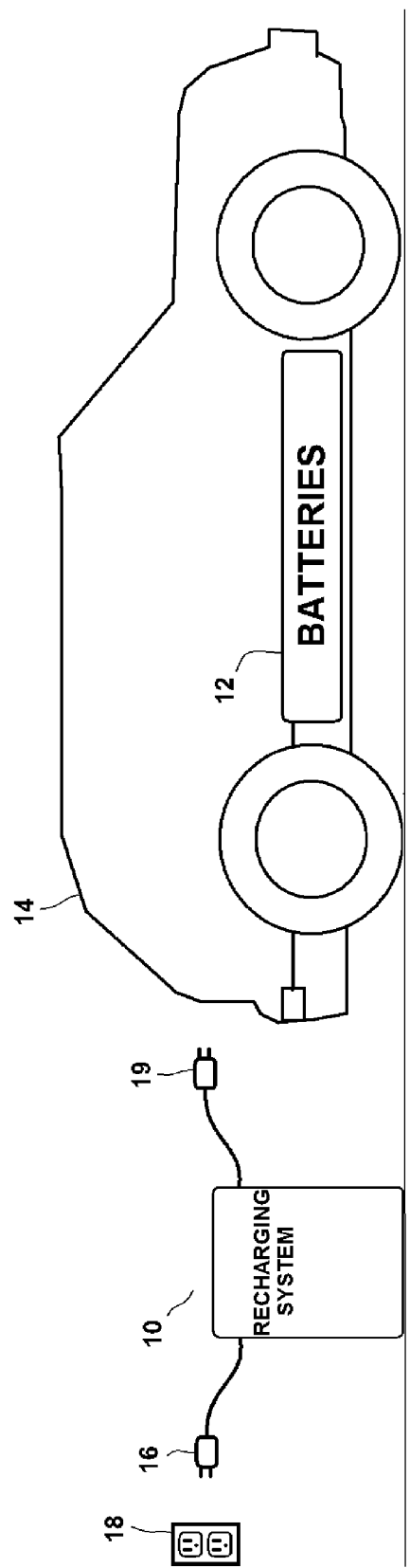
FIG. 1 is a schematic showing a battery recharger being used to recharge the batteries in an electric vehicle.

The Applicant has designed a variation of a tuned RLC circuit that is highly useful in recharging a battery. Referring to FIG. 1 in conjunction with FIG. 2, a recharging system 10 is shown that can be used to recharge large capacity batteries 12, such as those found in electric vehicles 14. The recharging system 10 is powered using a standard plug 16 that plugs into a receptacle 18 that is wired to provide 240 volts at 60 Hz. The recharging system 10 has a second plug 19 that plugs into the electric vehicle 14.

Although the batteries 12 are within the electric vehicle 14, the batteries 12 create part of a tuned circuit 20. Thus, the tuned circuit 20 is not complete until the electric vehicle 14 is connected to the recharging system 10 and the recharging system 10 is plugged into a wall receptacle 18.

Figure 2:
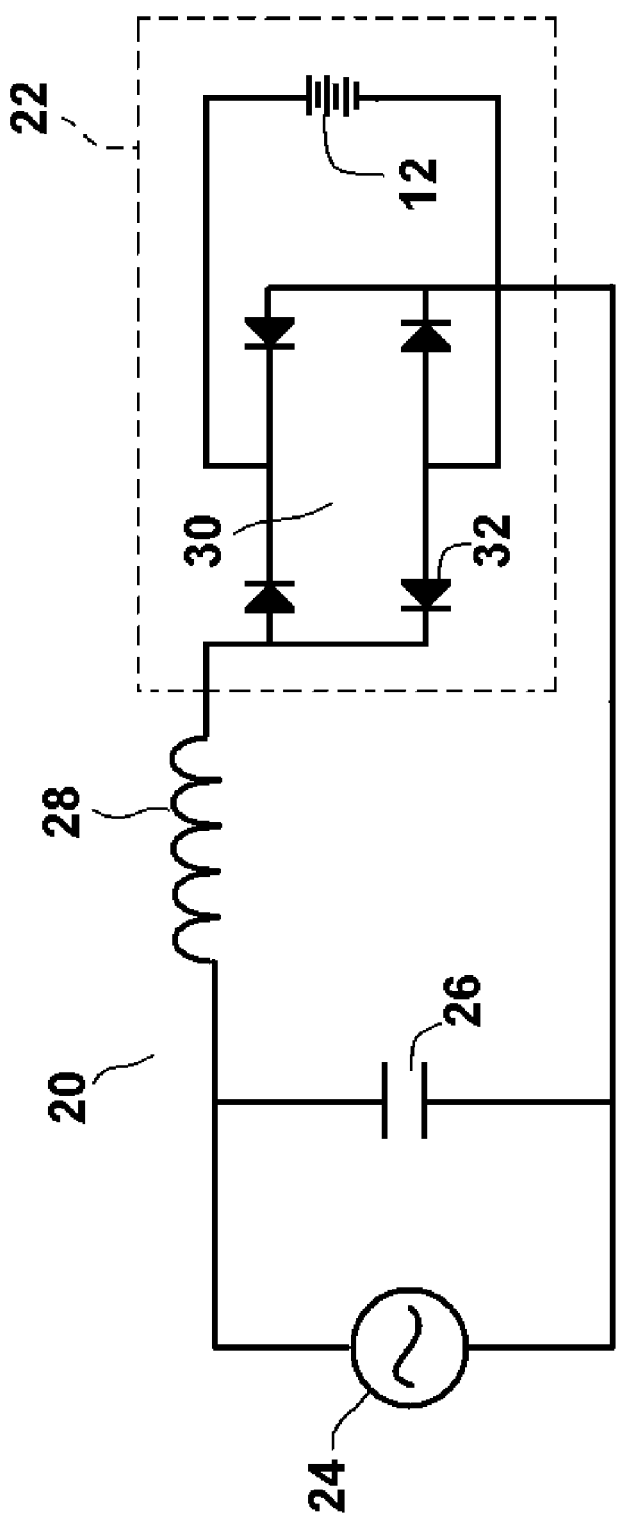
FIG. 2 is a circuit diagram showing the tuned circuit of the present invention.

In FIG. 2, the tuned circuit 20 is essentially a tuned parallel RLC circuit. However, the resistors used in a traditional RLC circuit have been replaced with equivalent circuitry 22. Although the equivalent circuitry 22 does not contain a resistor or resistive elements, the physics of the traditional RLC circuit remain and the circuit can be maintained and tuned at a resonant frequency in accordance with Equation 1.

In the tuned circuit 20, the power source 24 is a traditional AC power source provided by a utility company. As such, the power source 24 can provide 240 Volts at 60 Hz. The power source 24 is conditioned by a capacitor 26 that is in parallel with the power source 24. A load of the tuned circuit 20 is provided by an inductor 28, which takes the form of a coil. The resistor of the traditional RLC circuit is replaced with the equivalent circuitry 22 of the present invention. The inductor 28 and the equivalent circuitry 22 are in series. However, the capacitor 26 is in parallel with the inductor 28 and equivalent circuitry 22. The equivalent circuitry 22 contains the battery 12 to be recharged. That is, the DC battery 12 is being considered part of the AC tuned circuit 20. In order to make the DC battery 12 compatible with the otherwise AC tuned circuit 22, the battery 12 is joined to a rectifier 30. The rectifier 30 is a full wave rectifier that contains four diodes 32.

The rectifier 30 and the battery 12 combine to form the equivalent circuitry 22. The equivalent circuitry 22 is equivalent to an AC component even though the equivalent circuitry includes the DC battery. The overall tuned circuit 20 can now be considered a parallel tuned RLC circuit and can be set to a resonance frequency using the equation set forth in Equation 1. The tuned circuit 20 is inherently current limiting. No resistive elements are required. The maximum current is limited by the inductor 28. The inductor 28 has an inductive reactance of $X_L$, where $X_L=2\pi*Freq*L$. The inductor 28 can limit maximum current without generating any significant heat. However, the inductor 28 is also capable of storing electrical energy, where the Watt stored=½*L*Current².

When the tuned circuit 20 is powered, energy is stored in both the capacitor 26 and the inductor 28. The capacitor 26 and the inductor 28 strive for equilibrium, wherein the tuned circuit 20 resonates. As the tuned circuit 20 resonates, the power supply 24 continues to supply power. The result is an oscillating and resonating current that can be many times greater than the current being drawn from the power source 24.

The circulating current in the tuned circuit 20 is large, but 100% alternating. The alternating current is controlled, without the need for a transformer. The oscillating current is received by the rectifier 30. The rectifier 30 converts the alternating current into a direct current. The direct current is then fed to the battery 12 to recharge the battery 12. Thus, the battery 12 receives a DC current that is of the proper voltage and current without the need for a transformer or any resistive elements. The battery 12, therefore, receives the recharging current it requires with fewer losses. The recharging system 10, therefore, operates more efficiently and economically. Furthermore, since the tuned circuit 20 remains an AC circuit, no transformer is needed to reduce the AC voltage prior to a DC conversion. The recharging system 10 can therefore be manufactured much smaller, lighter, and cheaper than prior art battery chargers that contain large transformers.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A circuit for recharging a battery from an AC power source, comprising:
    a capacitor;
    an inductor;
    a rectifier;
    wherein said inductor and said rectifier and said battery form a series combination;
    wherein said capacitor is in parallel with said series combination; and
    wherein said capacitor, said inductor, said rectifier and said battery form a tuned circuit that resonates at a resonance frequency, and wherein said tuned circuit produces a resonating current at said resonance frequency that is greater than current being drawn from said AC power source.

2. The circuit according to claim 1, wherein said AC power source is in parallel with said capacitor.

3. The circuit according to claim 2, wherein said AC power source is 240 volts and said battery has an operational voltage of at least 48 volts.

4. The circuit according to claim 1, wherein said circuit does not contain any resistors.

5. The circuit according to claim 1, wherein said rectifier is a full wave rectifier.

6. The circuit according to claim 1, wherein said inductor is a coil.

7. A charging system for recharging a battery, comprising:
an AC power source, wherein a first alternating current is drawn from said AC power source;
a capacitor in parallel to said power source that receives said first alternating current;
an inductor that receives said first alternating current from said AC power source; and
a rectifier for rectifying any of said first alternating current passing through said inductor;
wherein said inductor, said rectifier and said battery form a series combination, and said series combination is in parallel to said capacitor, wherein said capacitor, said inductor, said rectifier and said battery form a tuned circuit that resonates at a resonance frequency, and wherein said tuned circuit produces an oscillating and resonating current at said resonance frequency that is greater than said first alternating current being drawn from said AC power source.

8. The system according to claim 7, wherein said tuned circuit does not contain any resistors.

9. The system according to claim 7, wherein said rectifier is a full wave rectifier.

10. The system according to claim 7, wherein said inductor is a coil.

11. The system according to claim 7, wherein said AC power source is 240 volts and said battery has an operational voltage of at least 48 volts.

12. A charging system for recharging a battery, comprising:
a first plug connector for electrically engaging an available AC power source, wherein an initial alternating current is received through said first plug connector from said AC power source;
a second plug connector for electrically engaging a battery in need of recharging;
a capacitor;
an inductor; and
a rectifier for rectifying any of said initial alternating current passing through said inductor;
wherein said inductor, said rectifier and said battery form a series combination, and said series combination is in parallel to said capacitor, wherein said capacitor, said inductor, said rectifier combine with said battery, when connected to said second plug connector, to form a tuned circuit that resonates at a resonance frequency, and wherein said tuned circuit produces a resonating current at said resonance frequency that is greater than said initial alternating current being drawn from said AC power source.

13. The system according to claim 12, wherein said tuned circuit does not contain any resistors.

14. The system according to claim 12, wherein said rectifier is a full wave rectifier.

15. The system according to claim 12, wherein said inductor is a coil.

16. The system according to claim 12, wherein said AC power source is 240 volts and said battery has an operational voltage of at least 48 volts.

* * * * *